April 8, 1952  C. L. LOUTHAN  2,592,441
BOBBER FOR USE IN CASTING FOR FISH
Filed April 3, 1950  2 SHEETS—SHEET 1
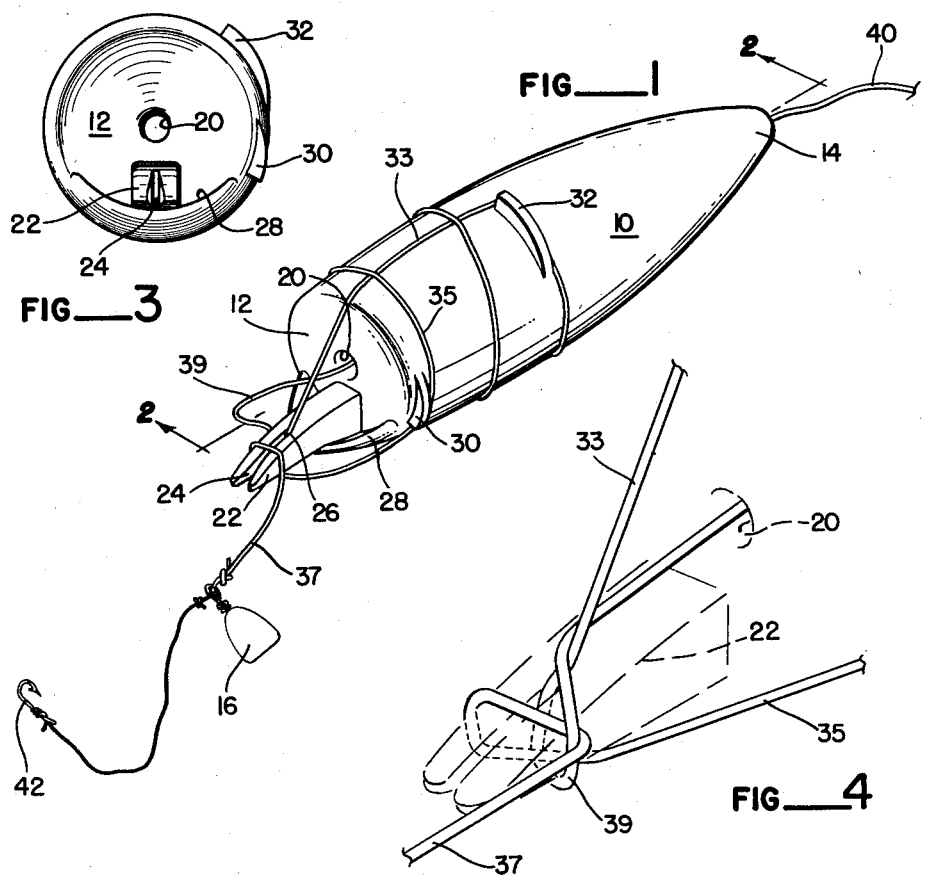
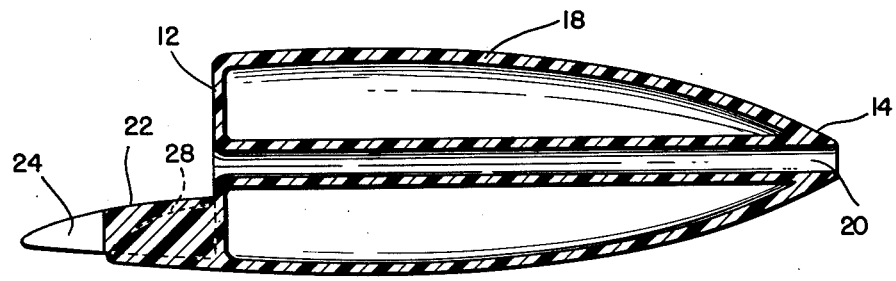
CLISSOLDE L. LOUTHAN
Inventor
By Smith & Tuck
Attorneys April 8, 1952 C. L. LOUTHAN 2,592,441
BOBBER FOR USE IN CASTING FOR FISH
Filed April 3, 1950 2 SHEETS—SHEET 2
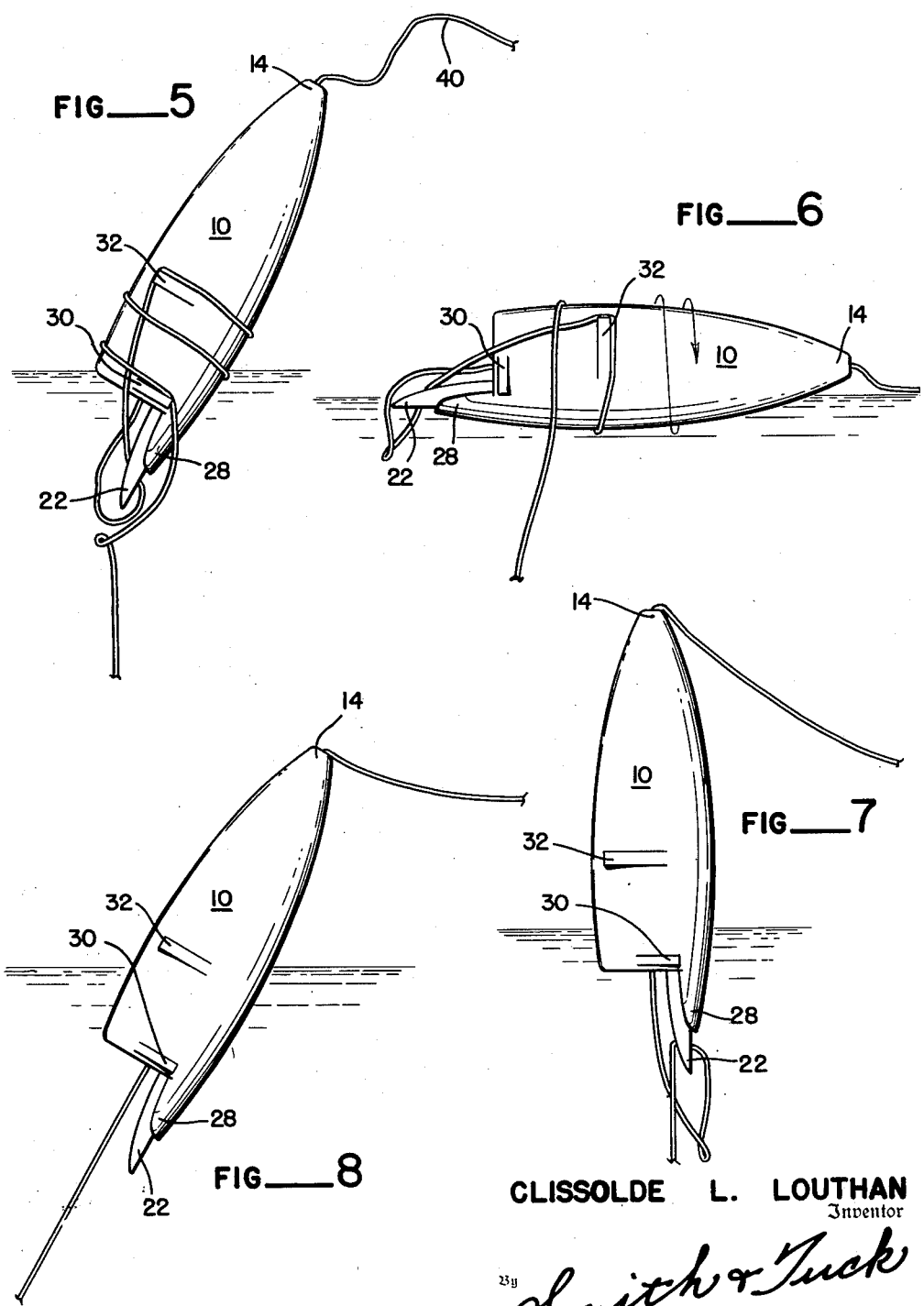
CLISSOLDE L. LOUTHAN
Inventor
By Smith & Tuck
Attorneys Patented Apr. 8, 1952

2,592,441

UNITED STATES PATENT OFFICE 2,592,441

BOBBER FOR USE IN CASTING FOR FISH

Clissolde L. Louthan, Yucaipa, Calif.

Application April 3, 1950, Serial No. 153,679

6 Claims. (Cl. 43—43.11)

1

This present invention comprehends a fishing bobber which is intended for use with a weighted fishing line, and which is so constructed that the fishing line intermediate the bobber and the sinker may be wound on the bobber and the entire unit cast as one package, and when the unit hits the water the weight will be released and as it descends in the water it will revolve the bobber and unwind from the same that portion of the line intermediate the bobber and the sinker. Provisions are further made whereby when a fish strikes the baited hook the bobber will act as normally, yet when the fisherman places tension on the fishing line the bobber will be released from its fixed position on the line and be free to run along the same so as to not intefere with the reeling in of the line in landing the fish.

Many types of fish are fished for with a weighted line which is held at a definite depth by means of a floating bobber. In this way a baited hook can be caused to come to rest at whatever elevation the particular fish are in the habit of feeding and this depth is maintained without any attention from the fisherman. In the past however, to employ this form of fishing it has been customary to use the long cane poles or other stiff poles so that the length of the pole would be considerable and it would be possible to throw the bait out to a fair distance. However, the distance that could be cast to with this arrangement was only a little over the length of the pole used and this placed definite and undesirable limitations on the fisherman in his quest for fish in certain areas.

With the further development of casting gear, and most especially the spinning type of casting gear, where casts can be made of long distance with light lines, there has been increasing demand for means that will permit the employment of the bobber type of fishing from a point maybe 50 or 100 feet, or even farther away from the fisherman. This is particularly advantageous to those fishermen who must fish the banks of streams or lakes; and, unless they can cast out to a considerable distance, their fishing area is very greatly restricted. The bobber being any distance, for instance 10 feet, from the weight, the cast is difficult with the ordinary equipment because this spacing of the bobber and weight makes the cast awkward and there is a tendency to entangle the line.

This present fishing bobber makes it possible to employ the sinker and bobber type of fishing at any distance to which a fisherman can cast

2 the equipment, as the bobber and weight are close together regardless of what ultimate spacing between the bobber and weight is desired after the same reach the water; and, the bobber and weight being cast as substantially a unit, an easy cast may be made and there is little danger of entanglement. The bobber is simple to use and economical to construct so that it can be supplied to the fisherman at a price he can well afford to pay.

The principal object of this present invention, therefore, is to provide a casting bobber which makes it possible to cast a baited hook with a weighting sinker and to predetermine the depth to which the baited hook will descend below the surface of the water.

A further object of this invention is to provide a piece of fishing gear which takes into account those essential conditions which are always reoccurring in each cast and adapting these conditions to the functioning of this present bobber.

A further object of this invention is to provide a bobber which makes it possible to fish pools on opposite sides of streams, or pools that are not normally accessible to a fisherman using conventional forms of fishing and which makes it possible for him to fish in any waters to which he can cast the normal casting weight.

A further object of this invention is to provide a bobber which is so constructed that it permits casting to achieve the desired results yet it does not interfere with the reeling in of a hooked fish.

Further objects, advantages and capabilities will be apparent from the description and disclosure in the drawings, or may be comprehended or are inherent in the device.

In the drawings:

Figure 1 is a perspective view showing the fishing bobber of this present invention with the associated gear employed therewith;

Figure 2 is a longitudinal sectional view, taken along a vertical plane, passed through the axis of the bobber of Figure 1;

Figure 3 is a view in elevation showing the large or lower end of the bobber;

Figure 4 is a perspective view illustrating the manner in which the line is secured to the bottom of the bobber during the casting operation;

Figure 5 is a side elevation showing the bobber at the instant it hits the water at the end of a cast;

Figure 6 illustrates the next step in the bobber's operation in which the intermediate line is unwound from the same;

Figure 7 is an elevational view showing the normal fishing position of the bobber and the associated parts;

Figure 8 illustrates the position of the bobber and the fishing line after a fish has struck and is being reeled in by the fisherman.

Referring more particularly to the disclosure in the drawings, the numeral 10 designates the bouyant barrel-like float body. This may be formed in various shapes. However, the form shown on the drawings has proved to be a very practical one, in that the leading end in the cast, or the bottom end when the float is fishing and which is designated by the reference character 12 is preferably the larger end and then the barrel-like body flows into a pointed end at 14. This form is desirable in that maximum bouyancy is provided for the float in the water and the minimum of elevated mass need be supported in the water. This is particularly of moment when the sinker as 16 is of light weight and has just sufficient mass to insure keeping the upper end truly upright. Having the bobber fish in an upright position becomes increasingly desirable as the point of fishing becomes more remote from the fisherman. The body of the bobber may be formed in any manner as long as it is lighter than water so that it will be buoyed up by the same. The body could be formed of cork, balsa wood, or any of the accepted materials. However, a preferred form of construction is that illustrated more fully in Figure 2 in which the unit is formed of plastic so that it can be molded to exact form and be colored as desired in a permanent manner. In Figure 2 it will be noted that the outer body of the barrel as 18 is formed of thin-walled material and disposed substantially axially with the float is a line receiving tube or bore.

Extending outwardly and substantially parallel to the bore 20 is a bifurcated prong 22. This prong is provided with a slot between the two tines thereof as 24 which is preferably tapered from its closed end, as 26, to the outer end of points. When so arranged, fishing lines of varying sizes can be readily accommodated as it is one of the functions of this prong to engage the fishing line and hold the same in that adjusted position, and this is a factor that determines the depth to which the fishing weight 16 can descend below the surface of the water in fishing.

In order to insure the proper functioning of the device without entanglement of the various portions of the line about prong 22, it has been found desirable to have a shielding lip as 28, formed preferably as an extention of the barrel-body, and to have this lip centered with respect to prong 26. The position of lip 28 with respect to the barrel and prong 22 is practically illustrated throughout the various views. It is desired to point out, however, that prong 22 should extend outwardly sufficiently or lip 28 stop at a point so that the entirety of slot 24 will be outwardly disposed from lip 28.

In using the bobber and in order to avoid entanglement of the line and to insure the smooth functioning of the device, it is desirable to carefully wind the line representing the depth to which the fishing is to be done upon the outer surface of barrel 10. To assist in the positioning of the line and to insure that it will not be dislodged during the cast and functioning of the device, two or more lugs are usually provided, as the leading or bottom lug 30 and the lug 32, which can be at any point on barrel 10. For normal fishing depths, however, if lug 32 is placed about intermediate the ends of the barrel it will normally provide sufficient spooling space for the line to be wound on it. A study of Figures 1 and 5 will illustrate the functioning of these lugs. They, in effect, become turning points where the line being wound on the body, changes direction. These are normally the points where displacement, movement, or slippage will occur and thus permit the various coils themselves to become loosened and fly out of position. This would cause a tangling of the line during the casting operation and lug means is very necessary to avoid the same. It will be noted that lugs 30 and 32 are oppositely faced, the reason being to provide definite vertical abutments for the positioning of the line as it changes direction.

Method of operation

In using this fishing bobber for casting, the fisherman determines the amount of line he wishes to have intermediate bobber 10 and the fishing weight or sinker 16. When this length of line is measured out the line is then engaged in slot 24 and pressed in between the tapering sidewalls of this slot until it is engaged with sufficient friction to insure its holding during the fishing operation and yet be loose enough so that when reeling in a fish it can be displaced therefrom. The extent of engagement plays no part in the casting operation. Having the line secured in slot 24, after the showing of the various views on Figures 1, 5, 6 and 7, that portion of the line indicated at 33 is brought back over the body of the bobber and wrapped around lug 32. The balance of the line, down almost to sinker 16, is then wound around the body. In the various views in the accompanying drawings only a few turns have been shown as wrapped around the float. This would be true of course in shallow fishing but if any great depth was to be fished there might be many turns of line around the body. When, however, the sinker is about to be wound on the body, the line, as portion 35, is passed around lug 30 and brought out substantially parallel to the prong 22. The sinker portion of the line as 37, after it leaves lug 30, is normally given one turn around prong 24. This is illustrated in Figure 1. The fisherman then pulls slack on the line at 39 in Figure 1, and pulls outwardly enlarging the loop shown at 39 until a half-hitch can be made from the same, and this is passed over the prong and thus secures the sinker portion of the line 37 in place on the prong. This relationship is probably sufficiently illustrated in Figure 4 in which a dashed line form of the prong is shown. The bore of the bobber is shown at 20 and the various pieces of line are identified by the same reference characters as in Figure 1.

When the operator now tightens on the main fishing line 40 as it extends beyond the float, the half-hitch becomes secured in its tightened position and will remain so as long as there is tension on line portion 39 which, of course, can only be achieved by having the main line 40, of which 39 is a part, under tension.

The bobber and its associated sinker and the fishing hook 42 are now in a position for casting and the same may be cast in any conventional manner as by a casting rod or a spinning rod, and throughout the cast there will always be a drag on the line 40 because the mass of the bobber and the fishing weight 16 are pulling the line out. However, when the bobber strikes the surface of the water, as illustrated in Figure 5, there is no longer any force carrying the line out so slack occurs in line 40 and the half-hitch previously formed by loop 39 slips off the tapering ends of prong 22. That illustrates one desirable characteristic of the tapering form of prong 22 which has been illustrated throughout the drawings. As soon as the half-hitch 39 has slid off prong 22 the weight 16 is no longer held in position with relation to the float and begins to sink. In sinking, however, it must unwind the intermediate portion of the line from about the body of float 10. This has been illustrated in Figure 6, when the desired or predetermined amount of line has been entirely unreeled from the body, we have the fishing condition illustrated in Figure 7 and this condition normally maintains until a fish has struck the lure or it is decided to retrieve the same.

If a fish hits the lure, the bobber, which is held in the position illustrated in Figure 7, is carried partly under the water, which is true of all bobbers in this form of fishing. The fisherman then has his signal that he has a strike and then he begins to take in his line. Normally the tension placed on the line in reeling in will be sufficient to release the line from engagement in slot 24. If this not sufficient, a little jerk on the line as is quite common to assure the setting of a hook in the fish will achieve this purpose, and the bobber will be free to float on the line which will pass, of course, through bore 20. Thus the float cannot be lost but it will not interfere with the reeling in of the fish or the same.

It is believed that it will be clearly apparent from the above description and the disclosure in the drawings that the invention comprehends a novel construction of a bobber for use in casting for fish.

Having thus disclosed the invention, I claim:

1. A casting bobber of the type intended for coaction with a sinker to enable a fisherman to cast the two as a unit and permit still fishing with the same at a point distant from the fisherman, comprising: a buoyant, substantially barrel-like float body with the addition of a tapered upper end, having an axially disposed bore therethrough, and having a flattened lower end; a prong at the lower end of said body and disposed substantially parallel to the bore of said body and at one side of said bore, said prong being bifurcated to form a pair of tines and a slot therebetween; said slot being tapering longitudinally of said body with its widest portion outward, said slot having such width at its narrow end as to frictionally secure a fishing line therein; a shielding lip formed as a continuation of the outer surface of said body, outward of and centrally positioned in respect to said prong and extending substantially to the inner end of said slot; and a plurality of line engaging lugs on said body adapted to form turning points for a line as the same is wound around said body.

2. A casting bobber of the type intended for coaction with a sinker to enable a fisherman to cast the two as a unit and permit still fishing with the same at a point distant from the fisherman, comprising: a buoyant, substantially barrel-like float body, having an axially disposed bore therethrough, and having a flattened lower end; a prong at the lower end of said body and disposed substantially parallel to the bore of said body and at one side of said bore, said prong being bifurcated to form a pair of tines and a slot therebetween, said prong being tapered to a smaller size as it extends away from said body; said slot being tapering longitudinally of said body with its widest portion outward, said slot having such width at its narrow end as to frictionally secure a fishing line therein; a shielding lip formed as a continuation of the outer surface of said body and having an annular lower edge, said lip being outward of and centrally positioned in respect to said prong and extending substantially to the inner end of said slot; and a pair of line engaging lugs on said body, one near the lower edge and the other spaced from and above the first lug, said lugs being oppositely faced in respect to the longitudinal axis of said body.

3. A casting bobber of the type intended for coaction with a sinker to enable a fisherman to cast the two as a unit and permit still fishing with the same at a point distant from the fisherman, comprising: a buoyant, annular, elongated body, having a central bore therethrough; a prong at the lower end of said body extending longitudinally therefrom, said prong being bifurcated to form a pair of tines and a slot therebetween; said slot being tapering longitudinally of said body with its widest portion outward, said slot having such width at its narrow end as to frictionally secure a fishing line therein; a shielding lip extending from the lower side of said body substantially to the inner end of said slot; and a plurality of line engaging lugs on said body adapted to form turning points for a line as the same is wound around said body.

4. A casting bobber of the type intended for coaction with a sinker to enable a fisherman to cast the two as a unit and permit still fishing with the same at a point distant from the fisherman, comprising: a buoyant, elongated body, having a central bore therethrough, and having a large flattened lower end; a prong at the lower end of said body and disposed substantially parallel to the bore of said body and at one side of said bore, said prong being bifurcated to form a pair of tines and a slot therebetween; said slot being tapering longitudinally of said body with its widest portion outward, said slot having such width at its narrow end as to frictionally secure a fishing line therein; said prong being tapered to a smaller size as it extends away from said body; a lug on said body near its lower end having a line engaging face adapted to form a turning point for a line as the same is wound around said body; and a shielding lip formed as a continuation of the outer surface of said body, extending substantially to the inner end of said slot.

5. A casting bobber of the type intended for coaction with a sinker to enable a fisherman to cast the two as a unit and permit still fishing with the same at a point distant from the fisherman, comprising: a buoyant, elongated body, having a central bore therethrough; a prong at the lower end of said body and disposed substantially parallel to the bore of said body, said prong being bifurcated to form a pair of tines and a slot therebetween; said slot being tapering longitudinally of said body with its widest portion outward, said slot having such width at its narrow end as to frictionally secure a fishing line therein; said prong being tapered to a smaller size as it extends away from said body; and a plurality of line engaging lugs on said body adapted to form turning points for a line as the same is wound around said body.

6. A casting bobber of the type intended for coaction with a sinker to enable a fisherman to cast the two as a unit and permit still fishing with the same at a point distant from the fisherman, comprising: a buoyant, elongated body, having an axially disposed bore therethrough, and having a large flattened lower end; a prong at the lower end of said body and disposed substantially parallel to the bore of said body and at one side of said bore, said prong being bifurcated to form a pair of tines and a slot therebetween; said slot being tapering longitudinally of said body with its widest portion outward, said slot having such width at its narrow end as to frictionally secure a fishing line therein; said prong being tapered to a smaller size as it extends away from said body; and a lug on said body near its lower end having a line engaging face adapted to form a turning point for a line as the same is wound around said body.

CLISSOLDE L. LOUTHAN.

REFERENCES CITED

The following references are of record in the file of this patent:

UNITED STATES PATENTS

| Number | Name | Date |
| --- | --- | --- |
| 322,088 | Behrens | July 14, 1885 |
| 755,683 | Miller | Mar. 29, 1904 |
| 1,598,577 | Hawkinson et al. | Aug. 31, 1926 |
| 1,918,507 | Westling | July 18, 1933 |
| 2,212,941 | Johnson | Aug. 27, 1940 |
| 2,518,213 | Wood | Aug. 8, 1950 |